United States Patent [19]
Smith et al.

[11] 3,738,704
[45] June 12, 1973

[54] AUXILIARY BICYCLE SEAT

[76] Inventors: Lloyd H. Smith, P. O. Box 1092;
John H. Hughes, 6111 Central Park Drive, both of Aberdeen, Wash. 98520

[22] Filed: July 26, 1971

[21] Appl. No.: 165,974

[52] U.S. Cl............ 297/195, 297/DIG. 9, 297/243
[51] Int. Cl.............................................. B62j 1/00
[58] Field of Search ................. 297/195, 248, 214, 297/243

[56] References Cited
UNITED STATES PATENTS

| | | | |
|---|---|---|---|
| 3,266,218 | 8/1966 | Pentz | 297/195 |
| 3,377,084 | 4/1968 | Musichuk | 297/195 |
| 471,417 | 3/1892 | Buke | 297/195 |
| 460,072 | 9/1891 | Jones | 297/195 |
| 2,550,200 | 4/1951 | Murrell | 297/195 X |

*Primary Examiner*—James T. McCall
*Attorney*—Richard W. Seed, Benjamin F. Berry, Carl G. Dowrey et al.

[57] ABSTRACT

An auxiliary seat for use on either a male or female bicycle which receives its vertical support from the neck of the bicycle. The seat, which may be fabricated of one piece, slips over the neck of the bicycle and is clamped in place. The fact that the bicycle need not be altered in any way and further none of the structural elements of the bicycle need be removed or even unloosened allows rapid and easy removal and replacement of the seat.

10 Claims, 7 Drawing Figures

PATENTED JUN 12 1973
3,738,704
SHEET 1 OF 3

INVENTOR.
LOYD H. SMITH
JOHN H. HUGHES
BY
Seed, Berry, Dorsey & Cross
ATTORNEYS

AUXILIARY BICYCLE SEAT

BACKGROUND OF THE INVENTION

The current concern with the pollution of the atmosphere as well as the continual interest in maintaining reasonable physical condition to sustain life has led to an unprecedented boom in the sales and usage of bicycles.

One of the problems which the use of the bicycle has presented lies in the fact that many a rider has one or more small children which either must be taken with the adult on the bicycle or left with another adult serving as a baby sitter. In the interest of the family unit concept it is far more desirable that the child be taken with the parent rather than being left with a third person; however, the presently available means for carrying children on bicycles are not particularly safe for the passenger and tend to make the bicycle unstable.

A further drawback to the seats currently available exists in that they are very difficult to install and remove in that they must be mounted upon the axle or some other portion of the bicycle requiring a removal and replacement of a portion of the bicycle structure to complete securement.

Yet another problem with the currently available auxiliary bicycle seats lies in the fact that the seat is behind the rider and thus out of sight of the rider which in the case of a small child prevents proper supervision and/or surveillance to prevent accidents or injury, further, when a child is in the seat the normal fashion of mounting the male style bicycle is virtually impossible.

There are auxiliary seats which mount in front of the rider but these either mount directly upon the handle bars or front fork and therefore impede steering as well as causing a sudden shifting of the load, which may be dangerous in a critical situation, or alternatively receive their vertical stability from a vertical support member which extends downwardly to one of the bars on the frame, an arrangement not easily shifted from a male to a female bicycle.

With the above noted problems in mind it is an object of the present invention to provide an auxiliary seat for a bicycle whereupon a child or other passenger may be safely carried upon the bicycle and the support for the seat may be easily attached or detached.

It is another object of the present invention to provide a seat for use as an auxiliary seat on a bicycle wherein the seat is attached to the neck of the bicycle and receives for entire vertical support therefrom eliminating the need for additional support or the necessity of a permanent or semi-permanent attachment.

It is still a further object of the present invention to provide a bicycle seat wherein the seat is fabricated from a single piece of material with the exception of the fastening member, thus greatly simplifying the installation and packaging.

It is still a further object of the present invention to provide an auxiliary seat for bicycles which may be universally attached to either male or female type bicycles and not limited to any particular manufacturer.

It is yet a further object of the present invention to provide a bicycle seat which is easily attached to or removed from a standard bicycle and which can support two children.

Yet another object of the present invention is to provide an auxiliary bicycle seat which supports a passenger and further provides a convenient storage and carrying means for small objects.

DETAILED DESCRIPTION OF THE DRAWINGS

Figure 1:
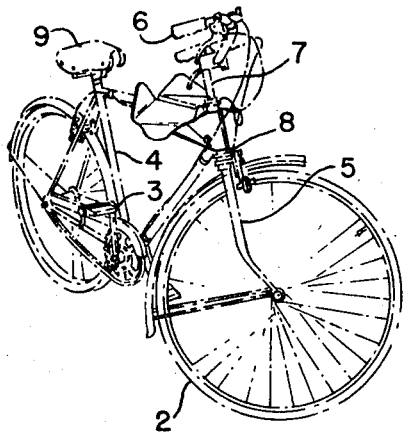
FIG. 1 is an environmental view showing an auxiliary bicycle seat in accordance with the present invention mounted upon a standard bicycle.

As can be seen in FIG. 1 the inventive bicycle seat is adapted to be attached to a standard bicycle having wheels 2, pedals 3, a main frame 4, a yoke 5, handle bars 6, having a stem 7 locked into a neck 8 and a seat 9.

Figure 2:
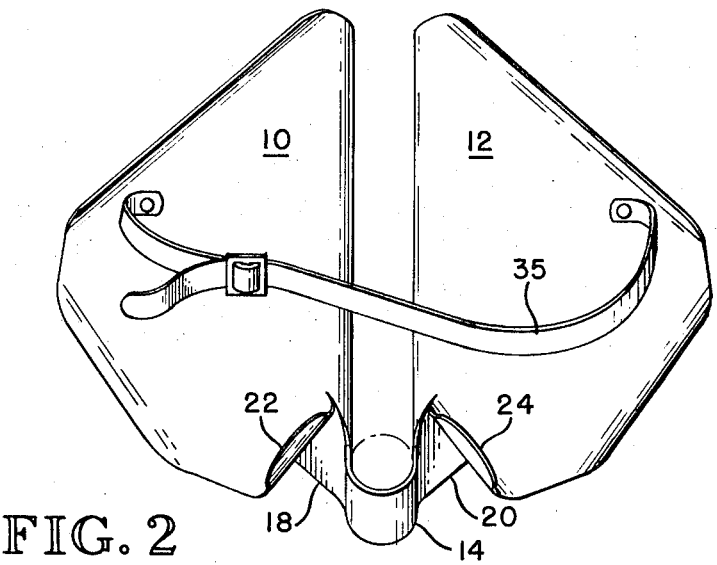
FIG. 2 is a plan view of an auxiliary bicycle seat in accordance with the present invention.
Figure 3:
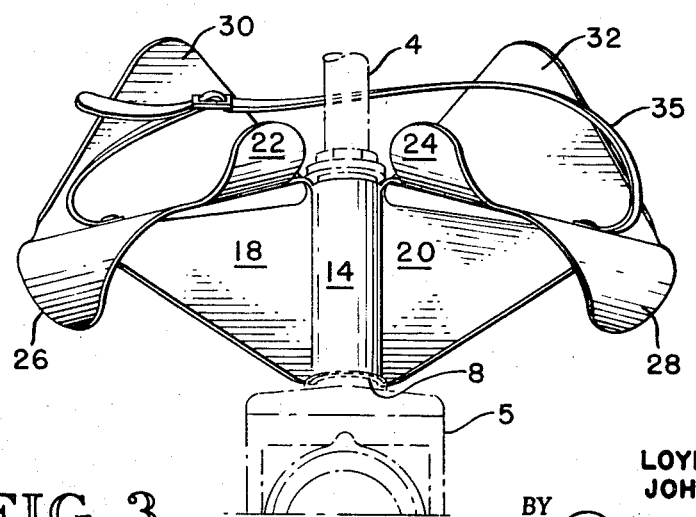
FIG. 3 is an elevational view of the bicycle seat as shown in FIG. 2.
Figure 4:
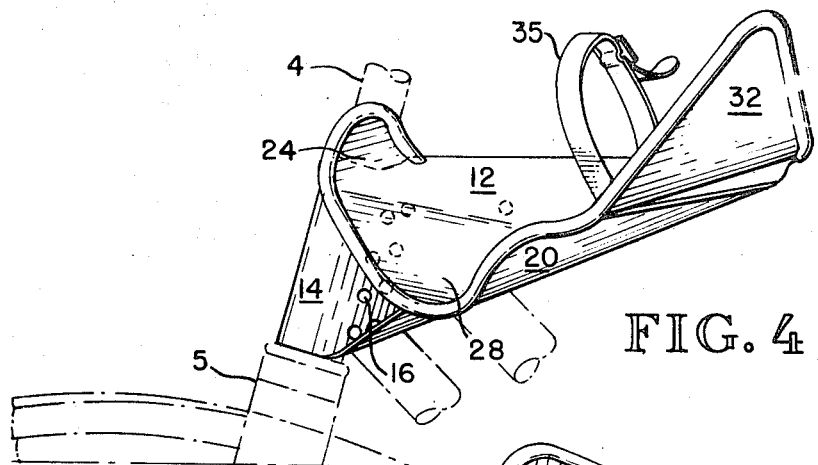
FIG. 4 is a side view of the bicycle seat as shown in FIG. 2.

The embodiment of the present invention, as depicted in FIGS. 2, 3 and 4, comprises a generally delta shaped seat when viewed in plan having two spaced seating sections 10 and 12 joined by a flexible, integral bridging member 14. The bridging member 14, as noted above, is an integral part of the seat, serving as the means for securing the seat to the bicycle. As best seen in FIGS. 3 and 4 member 14 is wrapped around and placed in engagement with the neck of the bicycle at the top of the yoke. Bolts (not shown) are then passed through the appropriate ones of the plurality of holes 16 as seen in FIG. 4 at the proper position to clamp the bridging portion 14 to the neck. The bridging member 14 is securely held in position by a combination of clamping 14 around the neck 8, the bottom of member 14 resting against the top of the yoke 5 and further by the fact that any weight placed upon the seat portions 10, 12 tends to cause the member 14 to cock with respect to the neck 8, thus mechanically locking it in place. The clamping action will generally be sufficient to hold the seat in position when the seat is unloaded and once some weight is added the mechanical advantage secured through a lever type action will multiply the locking force.

It is to be understood that with regard to the seat described hereinabove, as well as the embodiments described hereinafter, that although the neck will provide all of the necessary vertical support when the seat is installed upon a male style bicycle, the seat may rest upon the bar. When the seat is mounted upon a female style bicycle, the clamping force necessary to hold the seat in place will undoubtedly squeeze the seat together upon the frame and thus add additional vertical support as well as preventing a twisting movement about the stem.

Referring again to FIGS. 3 and 4 it can be seen that when the seat is formed the continuation of the sides of the bridging member 14 are folded upwardly and secured in place by welding or the like under the outside corners of the delta shaped seat portions 10 and 12 thus forming a triangular shaped reinforcing member 18 and 20, one under each of the seat portions 10 and 12. Any weight placed upon the seat portions 10, 12 will tend to flex these portions in a downward direction and the portions 18, 20 extending from the member 14 angularly upwardly to the rear of the seat forms a rigid load supporting triangle. As can be seen in FIGS. 2 and 4 the front portion i.e., adjacent the bridging member 14 of the seat portions 10 and 12 has the inner corner i.e., that closest to bridging member 14 bent in an upward direction forming a pair of upwardly extending ears 22, 24. When a passenger is in place on the seat, the upwardly extending ears 22, 24, prevents them from swinging their legs close enough to the front wheels that their feet could be caught in the spokes. As best seen in FIGS. 3 and 4 the portion whereat the passenger's legs will project beyond the seat and thus hand downwardly in a comfortable position is rounded by having downwardly turned lips 26, 28. The back of the seat is formed by a pair of upwardly projecting ears 30, 32 which are formed as an integral member of the seat itself and prevent rearward movement of the passenger.

As is shown the seat may well be provided with a safety strap 35 having a conventional buckle which may be secured at any convenient place. In the preferred embodiment the strap will be secured at the same place that the reinforcing members 18, 20 are secured to the seat members 10 and 12, thus reducing the perforations or weld in the seat surface.

It is within the contemplation of the present invention that the edges of the seat, where they may cause injury to the rider or passenger may be padded with a separate strip or rolled in a manner well known in the art and not considered a part of this invention. It is further within the contemplation of this invention that the seat may be entirely covered, in a more luxurious model, by a piece of stretch naugahide or the like which would be held secure by its interaction with the ears 22, 24, the ears 30, 32 and the depending flanges 26, 28.

Figure 5:
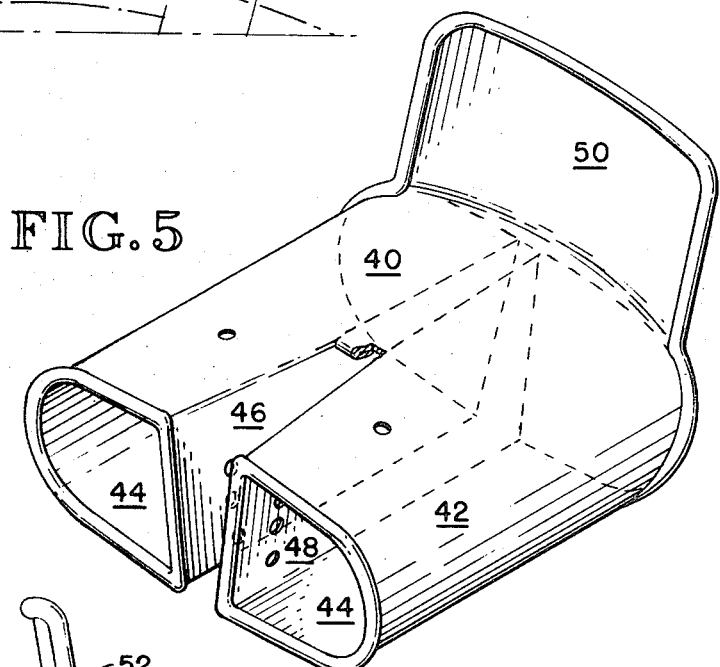
FIG. 5 is an isometric view depicting a second seat manufactured in accordance with the present invention.
Figure 6:
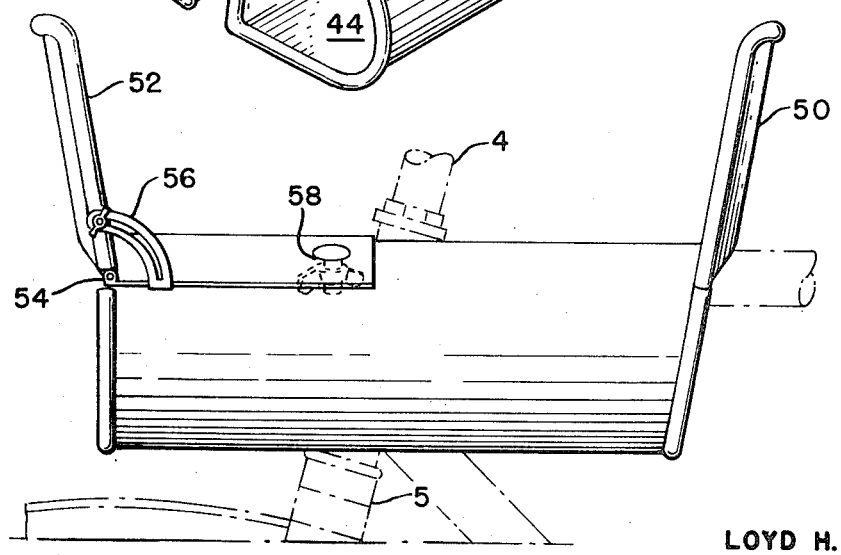
FIG. 6 is a side view of the bicycle seat of FIG. 5 modified to accommodate a second child.

Referring now to FIGS. 5 and 6 a second embodiment of the auxiliary seat for bicycles is shown utilizing the same methods of attachment whereby the bicycle auxiliary seat may be used on either a female or a male bicycle interdependently without necessitating a structural modification to the bicycle itself or requiring removal of a portion of the bicycle. Referring now in particular to FIG. 5 it can be seen that the seat is made of a single piece of metal which is bent in a tubular fashion forming a pair of parallel tubes with spaced generally parallel adjacent walls, curved outer surfaces and a common integral top linking element. The outer ends are secured adjacent the top forming a rigid structure. By forming the seat in this fashion the final product consists of a generally smoothly curves upper portion 40, a pair of rounded outside edges 42, a pair of flat bottoms 44 and relatively vertical inside walls 46, 48.

To secure the seat to the bicycle the sidewalls 46, 48 would be placed in a straddling position over the neck of the bicycle and the two elements squeezed together by bolts or any other convenient commercially available fastening member. To provide support for the back of the passenger the sheet when originally folded would have an outwardly extending tab which is folded upwardly to form a back support 50. As noted above it may well be desirable or necessary to provide the edges of the seat with a padding or beading such as is well known in the art.

Referring now to FIG. 6 which is a side view of the seat described with respect to FIG. 5 but has been extended slightly at the leftwardmost end as seen in this view and has a removable back 52 which is secured to the seat portion by a pair of bolts and wing nuts 54. It is to be noted that this model of the seat will have a second passenger space in the opposite direction and is adapted to have the seat back 52 fold forwardly in the event that only one child is on the bicycle. The collapsability of the seat back 52 is made possible by hinge 54 and a disappearing brace member 56, both elements being well known with respect to cabinet structures.

The advantage of the bicycle seat shown in FIGS. 5 and 6 lies in the fact that the areas within the two D-shaped tubular members which form an integral part of the seat could easily be used for storage of such things as sweaters, goggles, gloves or the like and would require only the addition of a door, spring biased clamps, or the like.

Figure 7:
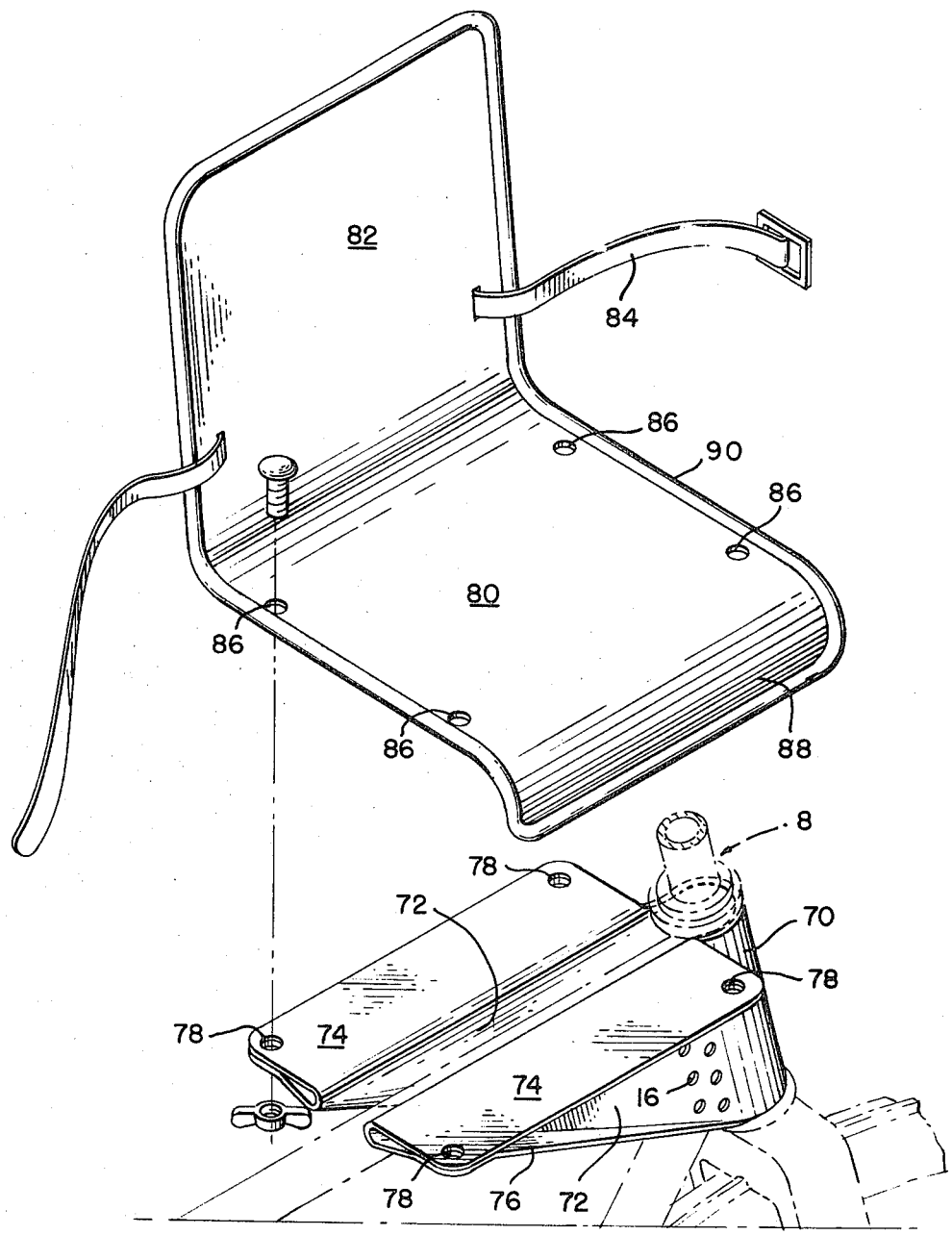
FIG. 7 is an exploded view of an alternate mounting means and further depicting another possible seat securable to the mount.

Referring now to FIG. 7 it can be seen that the seat may well be fabricated in two parts. The mounting bracket comprises a neck encircling portion having a neck engaging element 70 which is adapted to cover substantially the entire length of the neck 8 of the bicycle and being of a general U-shaped in cross section. The base of the U is adapted to be at the front of the bicycle and the sides 72 extending rearwardly. The sides 72 of the bracket, where, when mounted, extend beyond the neck terminate in an upwardly facing outwardly flared flange 74 which presents a substantially planar mounting platform. The flanges 74 are reinforced by sides 72 and an upwardly tapered outwardly flared flange 76 and have holes 78 in each of the corners.

It may thus be seen that the brackets as hereinabove described provides a stable platform and may be used to support a delta shaped seat as shown in FIGS. 1–4 except that the detachable portion would cover the gap between the sides of the bracket.

An alternate seat, as seen in FIG. 7, allows the rider to sit "side saddle" and comprises a seat portion 80, a back 82 and a belt 84. The seat portion 80 includes holes 86 complementary to holes 78 in the bracket and a curved front portion 88. As was the case with the other seats, the edges may be covered with a protective beading 90.

Thus it can be seen that the bicycle seat as described hereinabove provides an easy means for providing auxiliary seat for a child or if necessary an adult. The seat as described hereinabove is easily detached to be removed, does not require any alterations upon and vertically detachable to either a male or a female type bicycle. The placement of the child in the hereinabove described seat is desirable since it is in front of the adult or other bicycle rider where it is under constant surveillance thus preventing accidental injury and further the child has a far greater visibility not being strapped behind the rider and thus would be more likely to be content. Further the childs natural position will include the grasping of the handlebars which will have a tendency to make the child aware of the bicycle's movement and thus more likely to sit in a secure position.

The embodiments of the invention in which an exclusive property or privilege is claimed are defined as follows:

1. A one piece auxiliary seat for use upon bicycles comprising;
   a first portion for securement adjacent a relatively vertical element of a bicycle,
   continuous rearwardly extending vertical planar portions for passing upon either side of the vertical element and adapted to be clamped against the vertical element,
   means for clamping the vertical planar portions against the vertical element,
   a relatively planar portion extending rearwardly of the first portion for supporting an individual whereby the auxiliary seat is supported, when mounted on the bicycle, by the interaction between the first portion, the rearwardly extending vertical planar portions and the vertical element and does not require any further support.

2. A carrier as in claim 1 wherein the seat is mounted to the steering post and extends downwardly from the planar portion to contact the sides of the rail thus preventing pivotal motion about the steering post.

3. A carrier as in claim 1 wherein the planar portion terminates in an upright flange preventing rearward movement of the passenger.

4. A carrier as in claim 1 wherein the planar portion is reinforced by material integral with the post engaging means which underlies the seat portion at a critical section.

5. A carrier as in claim 1 wherein the portion beneath the planar portion serves as a storage or carrier portion for small objects.

6. A carrier as in claim 1 wherein the planar portion extends substantially beyond the post providing a second planar portion in front of the post.

7. A carrier as in claim 6 and further including a removable back for a second seat.

8. A carrier as in claim 4 wherein the reinforcing means forms a rigid support for the outermost portion of the planar and extends at an angle from the bottom of the neck engaging portion to the bottom of the seat.

9. A carrier as in claim 13 wherein the seat further includes a secondary means having a base and a back and is secured to the planar portion in a manner whereby the passenger sits transverse to the direction of travel.

10. An auxiliary seat for use on a bicycle comprising;
    means for attaching the seat to the bicycle, A seat portion having a general delta shape when viewed from above and including a pair of upwardly projecting ears at one corner adapted to be straddled by the legs of the rider, the sides adjacent the ears being downwardly turned to provide a smooth leg contacting portion and the sides opposite the ears extending upwardly and providing a back support for the rider whereby the rider has sufficient support and his legs are retained at a position spaced from the bicycle.

* * * * *